June 4, 1963 T. C. BERARD 3,092,099
KINESITHERAPY PAD
Filed Jan. 17, 1961 2 Sheets-Sheet 2
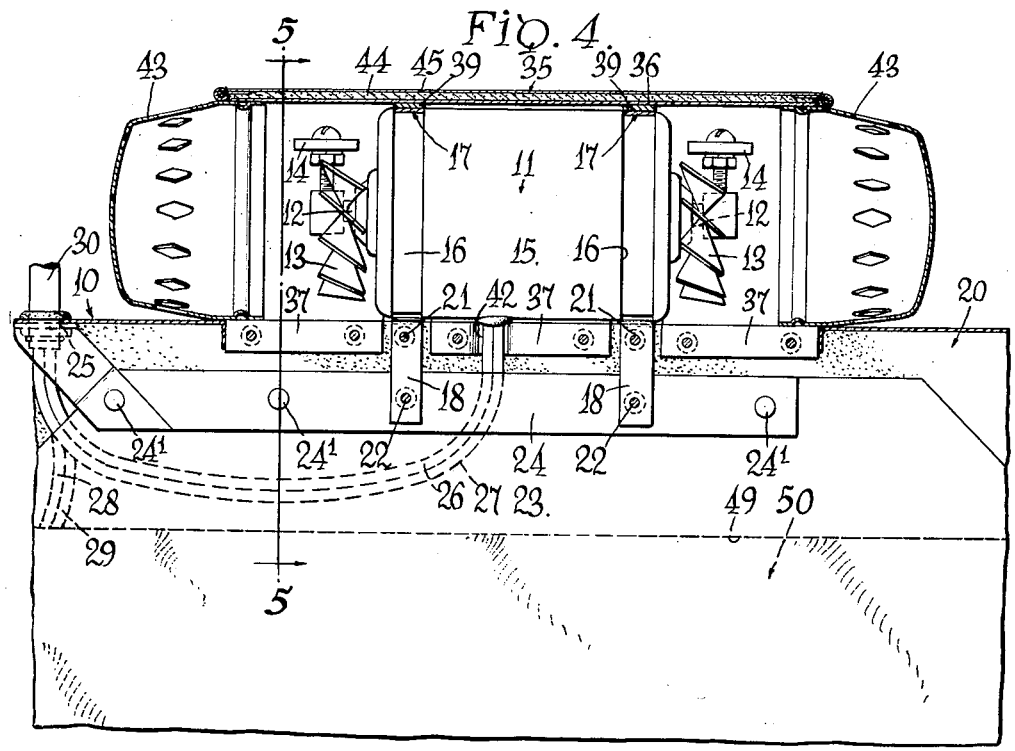
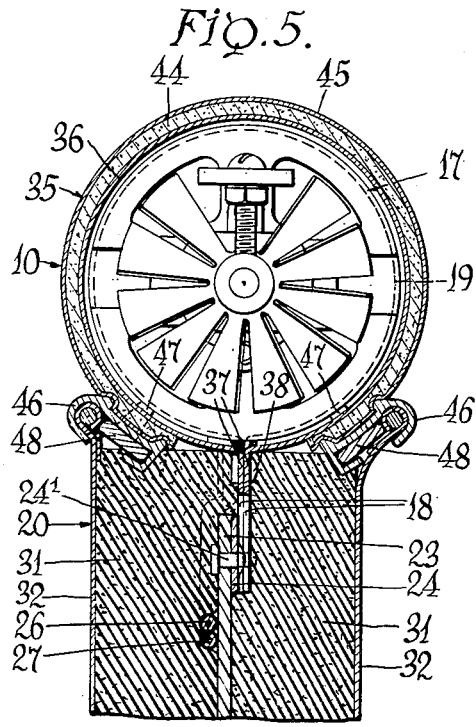
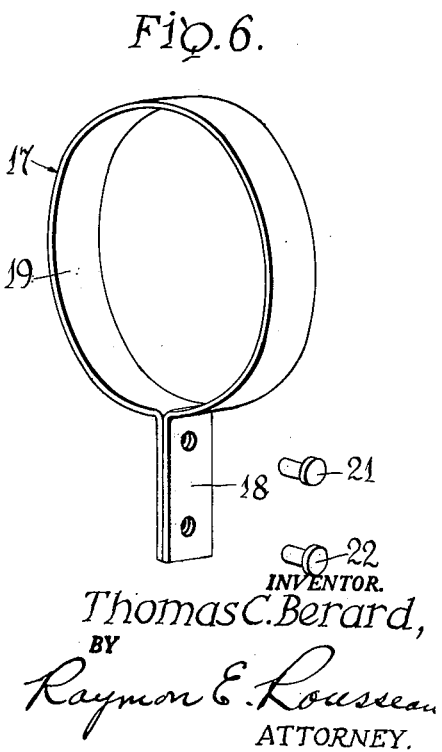
INVENTOR.
Thomas C. Berard,
BY
Raymon E. Rousseau
ATTORNEY.

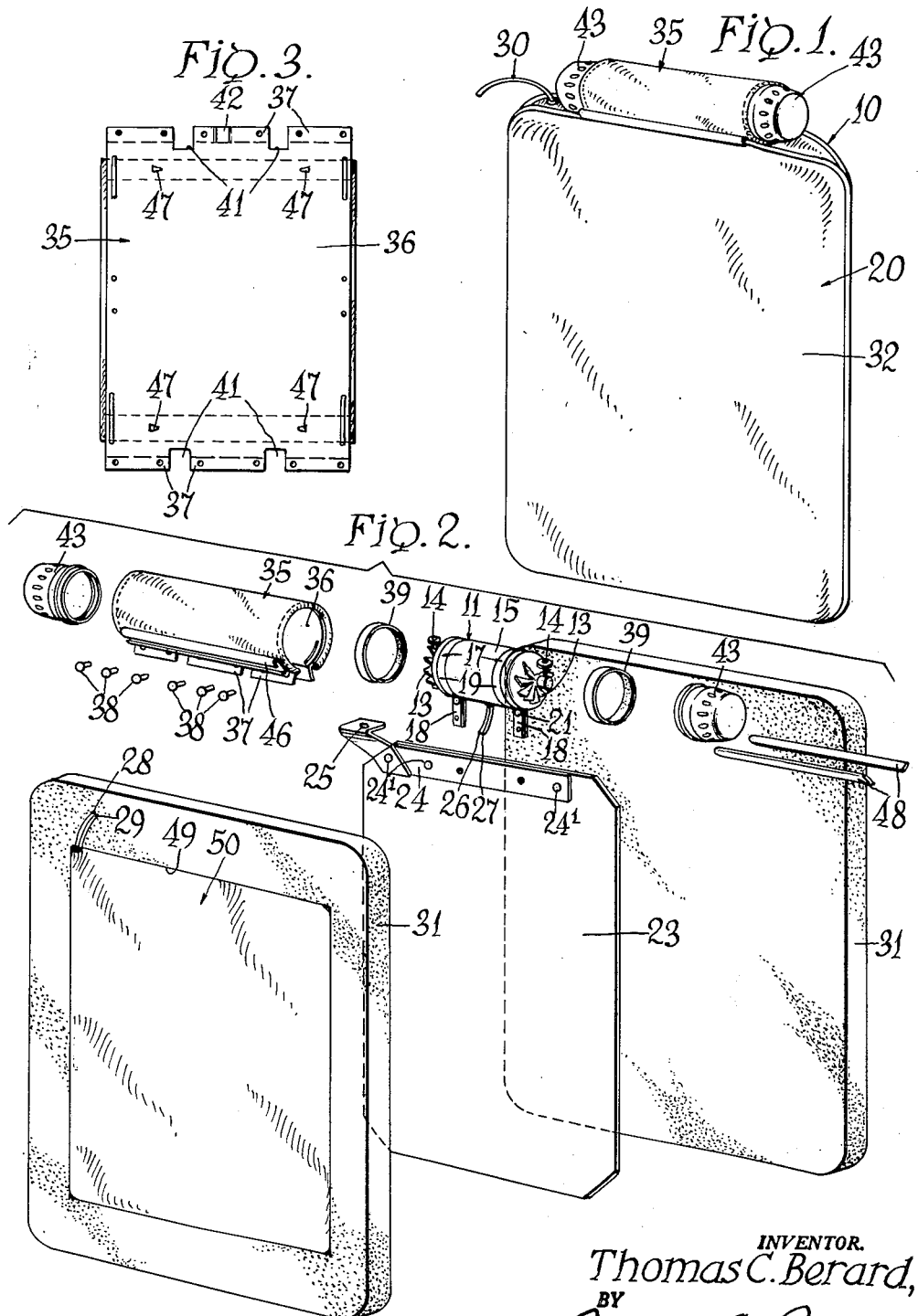

United States Patent Office 3,092,099
Patented June 4, 1963

3,092,099
KINESITHERAPY PAD
Thomas C. Berard, Silver Creek, N.Y., assignor to American Massage Sales and Manufacturing Corp., Silver Creek, N.Y., a corporation of New York
Filed Jan. 17, 1961, Ser. No. 83,274
4 Claims. (Cl. 128—33)

This invention relates to vibrating devices and more particularly to improvements in kinesitherapy devices wherein an electric motor has its shaft provided with eccentrically located weights which when rotated by said shaft directly produce vibrations of a laterally extending pad.

Heretofore, such kinesitherapy devices have had a plurality of resilient cushioning members in the form of resilient rubber rings secured upon the motor and a cylindrical shell or housing secured upon said rubber rings to encase said motor and to support a frame secured to and extending laterally from said housing and interposed between pads of resilient material encased in a covering material, whereby vibrations produced by rotation of the motor shaft and the eccentric weights are transmitted by such rubber rings to the shell, the frame and the pads.

A disadvantage of so constructing the prior kinesitherapy devices is that the rubber rings naturally absorb a portion of the vibrations produced by the motor, and therefore prevent a complete transference of the vibrations produced to the frame and the pads, so that a desired degree of vibration of the frame and pads can be attained only by increasing the eccentricity of the weights or by increasing their size, or by increasing the power of the motor.

An object of this invention is to simplify the construction and improve the performance of kinesitherapy devices whereby said devices can be manufactured and sold at a low price. Another object is to directly connect a vibration producing motor means to component parts of a pad, thereby to directly vibrate and produce a substantially uniform desired degree of vibration of said parts.

Another object is to provide a kinesitherapy pad having its vibration producing motor means directly and rigidly connected to a vibration distributing plate encased by resilient pads and a covering thereby to directly transmit vibrations thereto without appreciable loss.

Another object is to form the vibration producing motor means of a kinesitherapy device to directly receive and retain thereon the rigid means for directly connecting the motor to the plate independently of interposed means.

Another object is to provide the connector means of such a kinesitherapy device with non-resilient overlying means for spacing a cylindrical housing for the motor means in spaced concentric relation to the motor.

Another object is to provide the housing with a resilient pad encased by a covering and with means for securing said pad and covering thereon and for detachably securing the covering encasing the plate and its pads thereto.

Another object is to provide each end of the housing sheet with a perforated bell-like closure member for fully housing said motor and allowing a flow of cooling air thereto.

These and other objects of this invention will appear from a perusal of the following detailed description and the drawings wherein:

FIGURE 1 is a perspective view of a kinesitherapy device constructed in accordance with the principles of this invention.

FIGURE 2 is an exploded perspective view showing certain component parts of the device of FIGURE 1 in arbitrarily related positions.

FIGURE 3 is an inside plan view of the housing flattened to better show its formation.

FIGURE 4 is an enlarged fragmentary longitudinal sectional view of the device shown in FIGURE 1.

FIGURE 5 is an enlarged fragmentary cross sectional view taken about on the line 5—5 of FIGURE 4, and FIGURE 6 is a group perspective view of one of the pair of connector straps and an associated pair of fasteners.

Referring now to the drawings wherein like numerals denote like parts in the several views the numeral 10 generally designates a kinesitherapy device constructed in the following manner:

A suitable motor 11, having each end of its shaft 12 provided with a fan 13 and a suitable weight 14 preferably has each end of its stator housing 15 formed with a circumferential groove 16, to receive one of a pair of rigid connector straps generally designated by the numeral 17. The straps 17 have adjoining parallel leg portions 18 which project from the ends of a loop portion 19 rigidly secured in one of the grooves 16 against displacement as by a suitable fastener 21 passed thru alined holes in the associated leg portions 18. The thickness of the straps 17 may be greater than the depth of the grooves 16, thereby to space an embracing housing, to be hereinafter described, from the stator 15. However, it is presently preferred that the thickness of the straps 17 and the depth of the slits 16 be equal so that the outer surface of the loops 19 are flush with the outer surface of the housing 15. As shown in FIGURE 4, the loop portions 19 are each provided with spacing means designated by the numeral 39 and described later.

The leg portions 18 preferably extend radially from their loop portions 19 and adjacent their outer ends, are each formed with alined holes to receive suitable fasteners 22 by means of which the leg portions 18 are directly and rigidly secured to the top edge portion of a rectangularly shaped plate 23 which extends in a radial direction from the housing 15 and directly cooperates with a pad generally indicated by the numeral 20. The plate 23 being preferably formed of a sheet of glass fiber board, has its top edge portion reinforced by a sheet metal strap 24 secured thereto by fastenings 24′ and having one of its ends extended in angular relation thereto and provided with an opening 25 formed to support one end portion of an electrical cable 30. The opposite end portion of the cable 30 is provided with a conventional plug (not shown) and the cable 30 intermediate its ends is provided with a suitable control device (not shown) for starting, stopping and controlling the speed of the motor 11 and another electrical device to be hereinafter described.

The plate 23 is centrally interposed, sandwich fashion, between a pair of abutting sponge like resilient pad sections 31 of somewhat greater area than the plate and a suitable covering envelope 32 which fully encases the resilient pad sections 31, whereby vibrations produced by said motor are directly transmitted to the straps 17, without appreciable diminution, and to the plate 23 which, being in bearing contact with the adjacent faces of the pad sections, serves to distribute such vibrations substantially uniformly over the entire surfaces of the pad sections 31 and the covering 32.

Obviously the motor shaft, the fans and the weights must be encased to avoid injuring a user of the pad, and accordingly are encased by a suitable housing generally indicated by the numeral 35. The housing 35 preferably includes a longitudinally split cylindrical light-gage sheet metal portion 36 which by means of a pair of radially disposed spaced integral flange portions 37, connected by fastening devices 38, is tightly secured in embracing relation upon a pair of spacing strips 39. The strips 39 are preferably coextensive with and secured to the outer faces of the loop portions 19 as by a cement, and are formed of a non-metallic, tough and hard but bendable material, such as fibrous gasket material, which not only serves to transmit substantially all vibrations imparted thereto but which resists transmission of noises. The cylindrical portion 36, being thus mounted coaxial with and spaced from the motor housing 15 by the strips 39, has its flange portions 37 alined with the portions 18 of the straps 17 (FIGURE 5) and formed with cutaway portions 41 (FIGURE 3) to provide spaces between the flange portions 37 and the straps 17 which accommodate the leg portions 18. The vibrations produced by the motor are directly transmitted by the straps 17 to the plate 23 and are directly transmitted by the strips 39 to the housing portion 36.

The flange portions 37 are also formed to provide a space 42 (FIGURES 3 and 4) thru which the circuit wires 26 and 27 from the motor 11 extend into the pad and to the cable 30. The cylindrical portion 36 has each of its opposite ends closed by a perforated bell-shaped cap 43 thru which cooling air may flow to cool the motor 11 and is embraced by an overlying resilient pad 44 encased by a covering 45. The ends of the pad 44 and the covering 45 terminate in spaced parallel relation to the flange portions 37 and are secured to the portion 36 by a pair of C-shaped clips 46. The clips 46 may be secured to the portions 36 by any suitable means but are preferably secured thereto by a pair of spaced central integral extensions or tongues 47 (FIGURE 5) which have their terminal ends first forced thru the covering and pad and an alined opening in the portion 36 and then bent over, thereby to permanently secure the pad and its covering in embracing relation upon the portion 36.

It should now be apparent that because of the manner in which the cylindrical portion 36 is mounted on the motor, said portion, together with its pad and covering, will be also directly vibrated by the motor without diminution or loss of vibration therebetween.

In order to detachably secure the pad 20 to the housing 35 the upper beaded free edge portions of the covering envelope 32 are each inserted in one of the channels 46 and are detachably retained therein by inserting a suitably formed strip 48 therein in the manner indicated in FIGURE 5, whereupon the kinesitherapy pad is complete and ready for use.

In the event it is desired to heat the pad, one of the resilient pads 31 may be formed with a pocket 49 to receive a heating pad 50 whose circuit wires 28 and 29 are connected by the cable 30 to the control device referred to above but not shown.

It should be understood that the herein shown and described form of kinesitherapy pad is intended to exemplify the principles of this invention and that various modifications and rearrangements of its component parts may be made within the scope of the appended claims to directly vibrate vibratable parts thereof without diminution or appreciable loss in the transmission of vibrations thereto, and;

I claim:

1. A kinesitherapy device comprising, in combination: a vibration producing electric motor including a stator housing, a vibration distributing plate extending radially from the housing, rigid connector elements fixedly mounted directly upon said housing and each having radially projecting leg portions directly connected to said distributing plate, and a pad having support from the housing and comprising abutting sponge-like resilient sections, the distributing plate and the leg portions of the connector elements extending between the sections of the pad and the distributing plate being in bearing contact with the adjacent faces of the pad sections.

2. A kinesitherapy device as set forth in claim 1 wherein each rigid connector element includes a loop portion encircling and directly bearing upon the housing with the leg portions projecting from the adjacent ends of the loop portion.

3. A kinesitherapy device as set forth in claim 1 wherein a strip element is rigidly connected as a reinforcement to the edge portion of the distributing plate adjacent the motor and has a terminal angular arm to support circuit wires for the motor, the arm having an opening through which the circuit wires extend.

4. A kinesitherapy device as set forth in claim 2 wherein a strip of non-resilient material is mounted upon each loop portion, a casing serving as an enclosure for the motor is mounted upon the strips for support in spaced relation to the housing of the motor, a covering envelope encloses and supports the sections of the pad and means is connected to the casing for the support of the covering envelope in detachable relation.

References Cited in the file of this patent

UNITED STATES PATENTS

| 2,850,009 | McElwee | Sept. 2, 1958 |
| 2,852,020 | Murphy | Sept. 16, 1958 |
| 2,976,866 | Kalish | Mar. 28, 1961 |
| 3,019,784 | Eiden | Feb. 6, 1962 |

FOREIGN PATENTS

| 1,222,430 | France | Jan. 25, 1960 |